United States Patent [19]
Hansen

[11] Patent Number: 6,074,002
[45] Date of Patent: Jun. 13, 2000

[54] BICYCLE SEAT

[76] Inventor: James E. Hansen, 1251 19th St., Watervliet, N.Y. 12189

[21] Appl. No.: 09/374,917

[22] Filed: Aug. 13, 1999

Related U.S. Application Data

[63] Continuation-in-part of application No. 09/172,328, Oct. 14, 1998, abandoned.

[51] Int. Cl.[7] .................................. B62J 1/00; B62J 1/18
[52] U.S. Cl. ............................................ 297/201; 297/214
[58] Field of Search ................................. 297/195.1, 201, 297/202, 214, 312

[56] References Cited

U.S. PATENT DOCUMENTS

| | | |
|---|---|---|
| D. 295,120 | 4/1988 | Gordon . |
| 471,417 | 3/1892 | Bunker . |
| 620,284 | 2/1899 | Cross . |
| 621,139 | 3/1899 | Reuter ..................................... 297/312 |
| 674,864 | 5/1901 | Green .................................... 297/195.1 |
| 3,874,730 | 4/1975 | Marchello . |
| 4,108,462 | 8/1978 | Martin . |
| 4,176,880 | 12/1979 | Marchello . |
| 4,387,925 | 6/1983 | Barket et al. . |
| 4,613,187 | 9/1986 | Gordon . |
| 4,773,705 | 9/1988 | Terranova . |
| 4,950,004 | 8/1990 | Sunshine . |
| 5,387,025 | 2/1995 | Denisar ............................... 297/201 X |
| 5,709,430 | 1/1998 | Peters . |

FOREIGN PATENT DOCUMENTS 99922    11/1897    Germany .

*Primary Examiner*—Anthony D. Barfield
*Attorney, Agent, or Firm*—Hoffman, Warnick & D'Alessandro LLC

[57] ABSTRACT

A bicycle seat for improved comfort and performance. The bicycle seat comprises an elongated support member for supporting a rider, wherein the elongated support member includes a central portion and opposed end portions that extend outward and flare backwards and upwards relative to the central portion. The seat further comprises a left and right seat cushion immovably mounted over the elongated support member, and positioned in a V-shape configuration. The configuration of the seat provides improved rider comfort, while maintaining lateral stability for the rider.

20 Claims, 10 Drawing Sheets

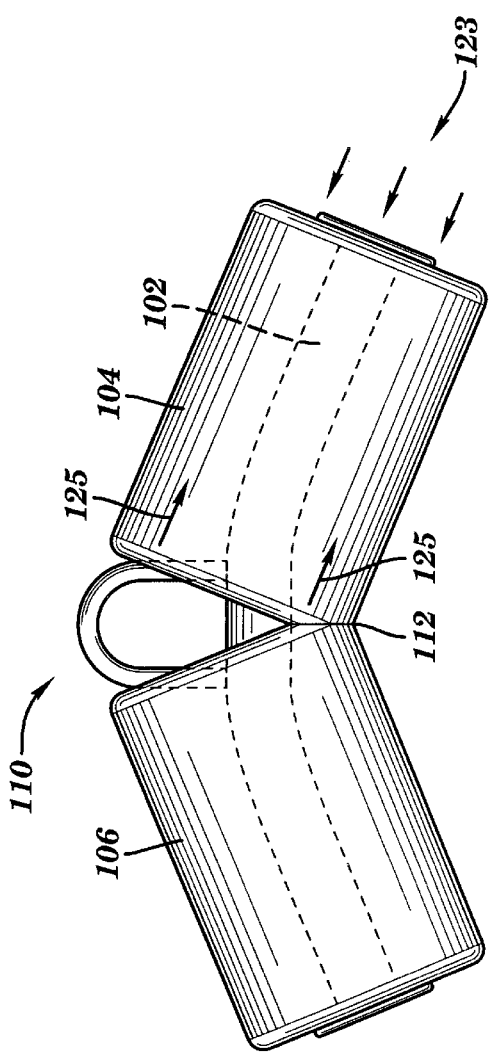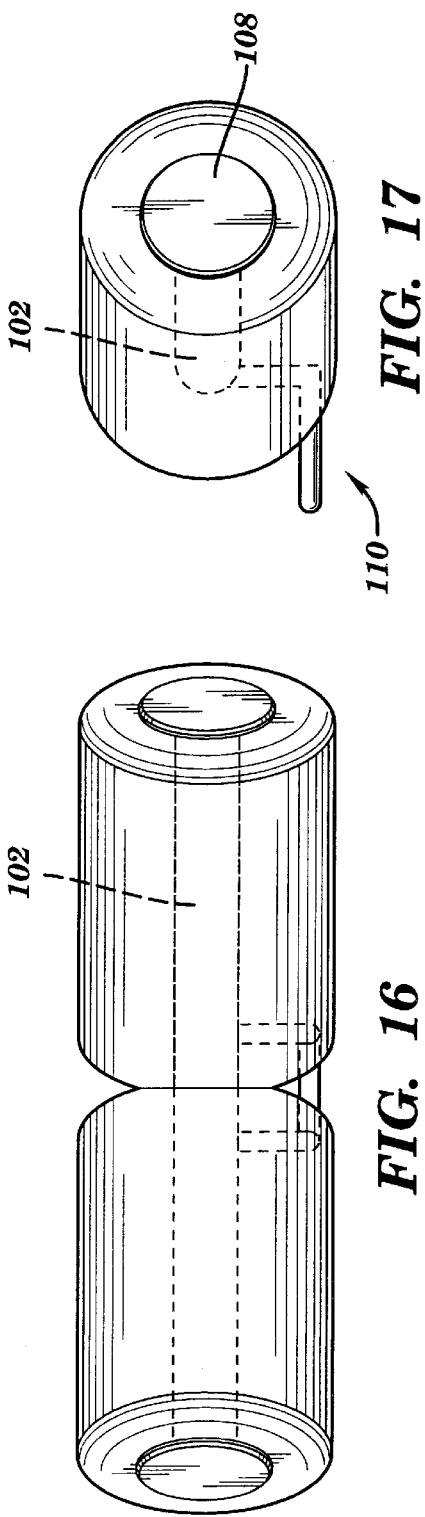

BICYCLE SEAT

This is a continuation-in-part of U.S. patent application Ser. No. 09/172,328, filed Oct. 14, 1998, entitled BICYCLE SEAT, now abandoned.

BACKGROUND OF THE INVENTION

1. Technical Field

The present invention relates to a seat configuration, and more specifically to a bicycle seat that provides improved comfort and performance.

2. Background Art

Bicycles continue to be used throughout the world as a means for transportation, recreation, exercise, and competition. Moreover, today's bicycles are often adapted for a specific purpose, such as highspeed road racing, touring, trail riding, and mountain biking. Accordingly, over the course of many years, bicycles have undergone many structural changes that have streamlined the designs and improved efficiency. Unfortunately, although much effort has been expended in improving the designs of bicycles, few improvements have been directed at the bicycle seat that address both comfort and performance.

Conventional bicycle seats or saddles are typically shaped with a seat section for supporting the rider and a forward protruding section to fit between the legs and in the crotch area of the bicycle rider. Because such seats are relatively uncomfortable and tend to abrade the legs of the rider during movement of the legs, efforts in the past have been made to change the various sizes and shapes of seats and to include various types of pads or springs. A more recently identified problem is the recognition that the forward protruding section of the conventional seat design can cause urethral damage and penile numbness, particularly when used continuously over a long period of time. In order to avoid these undesirable side effects which stem from the use of the conventional bicycle seat, efforts have been made to eliminate the "between the leg" forward protruding section in order to shift the support, and consequently pressure, away from the sub-scrotal area.

Numerous attempts to overcome these problems have been made without success due mainly to the fact that designs that eliminate the forward protruding generally result in decreased performance. Performance is particularly sacrificed because designs that eliminate the forward protruding section fail to provide adequate lateral stability for the rider. Specifically, such designs fail to keep the rider from slipping laterally (i.e., side-to-side) as they pedal. Accordingly, while such designs may improve comfort, they fail to provide the needed lateral stability that allows a rider to efficiently pedal the bicycle.

Thus, while such prior art devices provide improvements in the area of comfort, there still exists a great need to provide a bicycle seat that provides improved comfort and performance for the rider.

SUMMARY OF THE INVENTION

The present invention solves the above-mentioned problems of modem bicycle seats by providing a seat configuration that comprises an elongated seat member having a central portion attachable to a support member, wherein the elongated seat member has opposed ends that extend outward relative to the central portion and flare backward and upward relative to the rider. The seat may further comprise a first and second tubular cushion mounted around both ends of the elongated seat member to form seat cushions arranged in a V-shape configuration. The V-shaped seat likewise flares back and up relative to the rider.

The seat cushions may be immovably mounted onto the elongated seat member to provide better resistance, performance and comfort for the rider. In addition, the seat may comprise a support that includes a pair of longitudinal rods that are compatible with clamping mechanisms found on most traditional bicycle saddles.

It is therefore an advantage of the present invention to provide a seat configuration that eliminates the forward protruding section found on conventional bicycle seats in order to improve comfort.

It is therefore a further advantage of the present invention to provide a seat configuration that provides lateral support for the rider by providing a V-shaped seat that flares backward and upward relative to the rider.

It is therefore a further advantage of the present invention to provide a seat configuration that gives a bicycle rider increased mechanical advantage for pedaling.

The foregoing and other objects, features and advantages of the invention will be more apparent in the following more particular description of the preferred embodiments of the invention as illustrated in the accompanying drawings.

BRIEF DESCRIPTION OF DRAWINGS

The preferred exemplary embodiments of the present invention will hereinafter be described in conjunction with the appended drawings, where like designations denote like elements and:

FIG. 15 depicts a top view of a bicycle seat in accordance with a second preferred embodiment of the present invention;

FIG. 16 depicts a rear view of a bicycle seat in accordance with a second preferred embodiment of the present invention;

FIG. 17 depicts a side view of a bicycle seat in accordance with a second preferred embodiment of the present invention.

DETAILED DESCRIPTION OF THE INVENTION

First Preferred Embodiment

Figure 1:
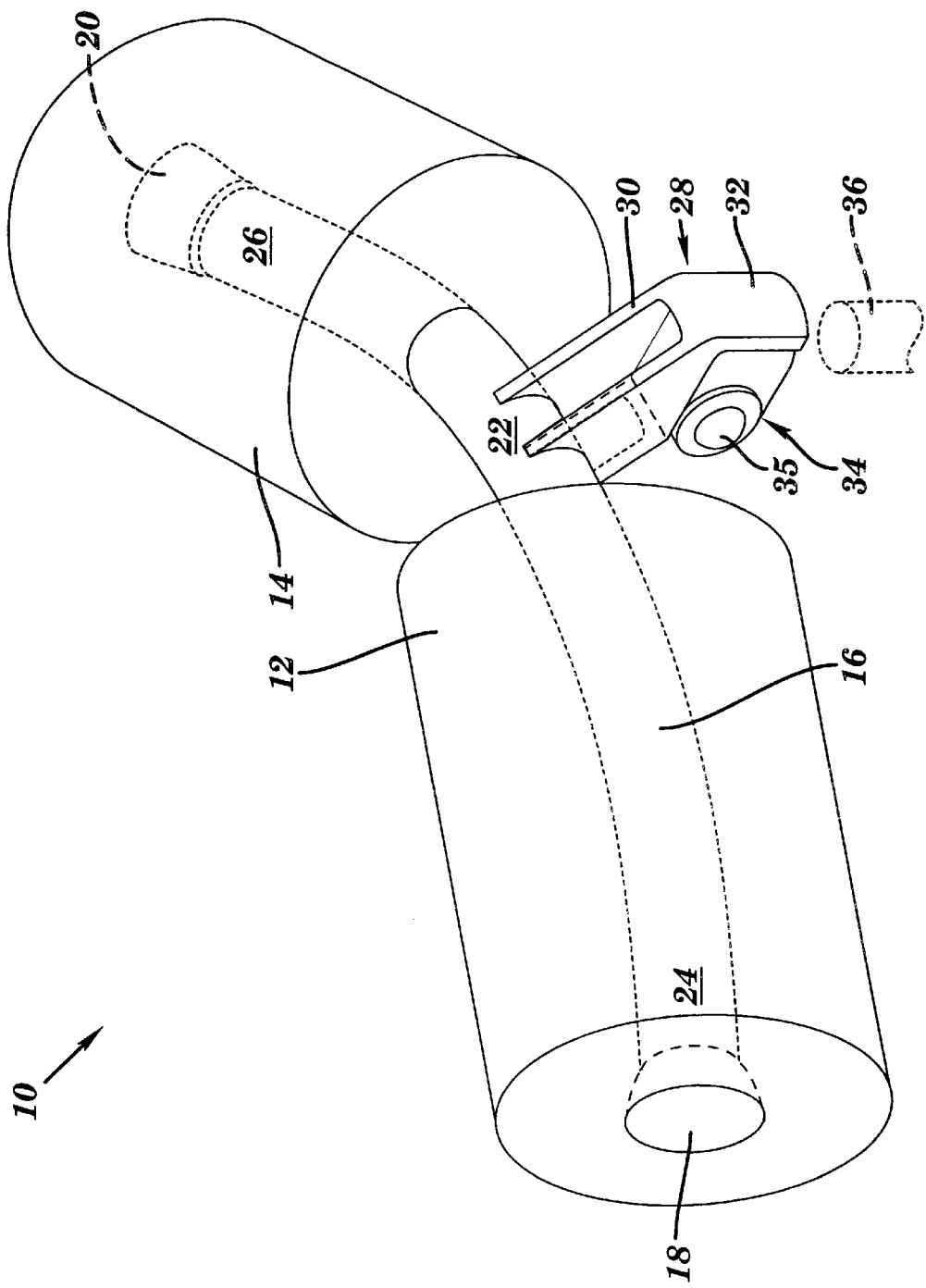
FIG. 1 depicts an isometric view of a bicycle seat configuration in accordance with a first preferred embodiment of the present invention.

Referring now to FIG. 1, an isometric view of a bicycle seat 10 is depicted. Seat 10 comprises an elongated member 16 that has a central portion 22, and first and second end portions 24 and 26. The seat further comprises a mounting member 28 for mounting elongated member 16 to a seat post 36. The mounting member 28 is fixed to the central portion 22 of the elongated member 16. The mounting member 28 comprises an angular section 30 and vertical section 32 that allow the seat to be positioned slightly above and back from the seat post 36. Mounting member 28 also includes a seat clamp 34 and fastening device 35 for fixedly mounting the seat 10 on seat post 36. While FIG. 1 depicts one specific configuration for support 28, it is recognized that any system for connecting elongated member 16 to seat post 36 could be substituted therefor. For example, quick release or quick clamp devices could be utilized.

Figure 5:
FIG. 5 depicts an elongated member in accordance with a first preferred embodiment of the present invention.
Figure 6:
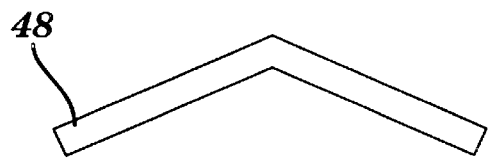
FIG. 6 depicts an alternative embodiment of an elongated member in accordance the present invention.
Figure 7:
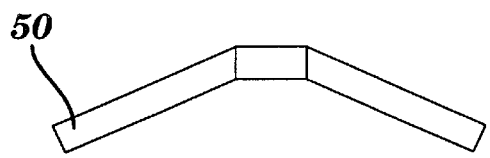
FIG. 7 depicts an alternative embodiment of an elongated member in accordance with the present invention.
Figure 8:
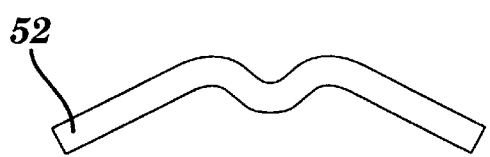
FIG. 8 depicts an alternative embodiment of an elongated member in accordance with the present invention.

Elongated member 16 includes ends 24 and 26 that extend outwardly relative the central portion 22 and flare backward and upward relative to the rider and seat post 36. The flaring of the ends 24 and 26 of elongated member 16 is accomplished by curving the elongated member as shown in FIG. 1 or by any number of alternative designs, such as those depicted in FIGS. 5–8. FIG. 5 depicts the curved implementation 22, FIG. 6 depicts a V-shaped implementation 48, FIG. 7 depicts a broken "V" configuration 50, and FIG. 8 depicts a wavy configuration 52. As is evident, any shape that provides a flare could be utilized, including multi-piece designs, and should be considered to fall within the scope of this invention.

Mounted over each end 24 and 26 of elongated member 16 are cylindrical seat cushions 12 and 14, which provide seat cushioning for the rider. The seat cushions 12 and 14 may be cylindrical in nature and adapted to slip over the elongated member 16 and be locked into place by end caps 18 and 20. The end caps 18 and 20, along with the curved configuration of the elongated member, act to hold the cylindrical cushions in place and keep them from rotating. Once attached, the seat cushions 12 and 14 form the V-shaped configuration that flares backward and upward relative to the rider and seat post 36 in a manner similar to the elongated member 16. It is understood that while the seat cushions 12 and 14 form two cylindrical pads, the shape of the cushions could be altered without departing from the scope of the invention. For example, the cushion could curve to follow the contour of the elongated member, or the cushions could have a non-circular cross-sectional surface (e.g., oval or polygonal). Moreover, it is understood that the seat cushions 12 and 14 could be formed as an integral part of the elongated member 16, rather than being separate.

By providing a seat configuration that includes a left 14 and right 12 seat cushion that flare backward and upward as shown in FIG. 1, numerous distinct advantages are gained. The first advantage is comfort since the forward protruding section that fits between the rider's legs in a traditional seat design has been eliminated. Accordingly, comfort and health issues related to traditional seat designs have been eliminated. The second advantage is that the present seat design maintains lateral stability for the rider even with the absence of a forward protruding section that resides between the rider's legs. Specifically, with the present configuration, the rearward and upward angle of the cylindrical cushions provide more than enough lateral support to allow the rider to maintain a stable lateral position during pedaling. A third advantage of the present configuration is that the flaring of the seat cushions allows the rider's legs to freely pump in an up and down configuration without interference from the seat. A fourth advantage of the invention is that the positioning of the seat configuration lends itself to being used by the rider's legs as a wedge to apply more mechanical force to the pedals through the rider's legs. In other words, the configuration provides a mechanical advantage to the rider in that they can brace their inner/rear thigh against the seat cushion to apply an increased amount of force to the pedal. In contrast, a traditional bicycle seat does not allow the rider to achieve an additional mechanical advantage since such seats do not have a brace position.

Figure 2:
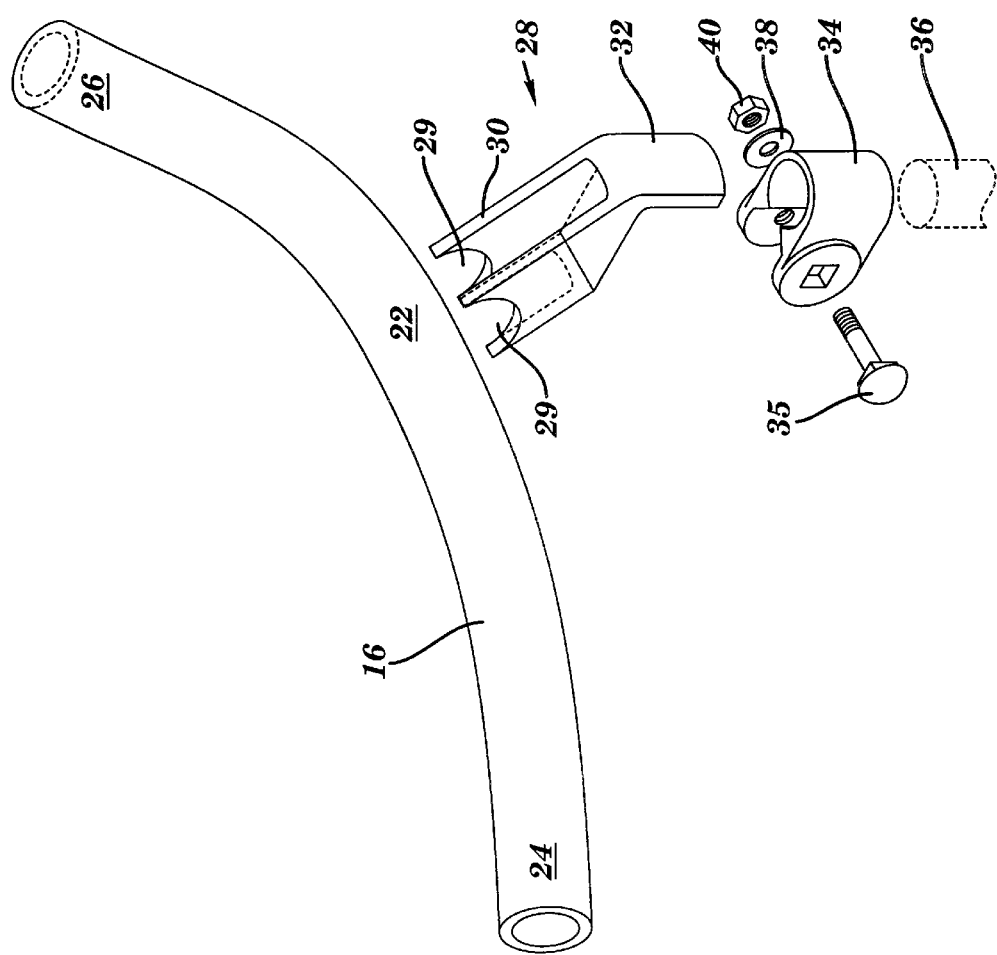
FIG. 2 depicts an exploded view of the bicycle seat of FIG. 1 in accordance with a first preferred embodiment of the present invention.

Referring now to FIG. 2, an exploded view of the seat 10 is depicted without the seat cushions. The elongated member 16 is mountable in the cutouts 29 formed within mounting member 28. The elongated member 16 may be welded or releasably fastened to the mounting member 28 in order to effectuate a solid and stable connection. It is also recognized that the elongated member 16 and the mounting member 28 could be integrally fashioned from a single piece of material, such as steel, titanium or the like. Moreover, while elongated member 16 is depicted as having a cylindrical cross-section, it is recognized that other cross-sectional configurations could be utilized, such as a square tube, a solid bar, a bar configured with a "x" cross-section, etc. The mounting member 28 is fastened to the clamp 34 in a fixed manner, such as with spot welding or the like, or may be integrally combined with the mounting member 28. The clamp 34 clamps onto seat post 36 with the aid of fastening device 35 (e.g., a bolt), washer 38, and nut 40. As previously noted, the mounting member 28 and clamping mechanism 34 could be altered without departing from the spirit and scope of the invention.

Figure 3:
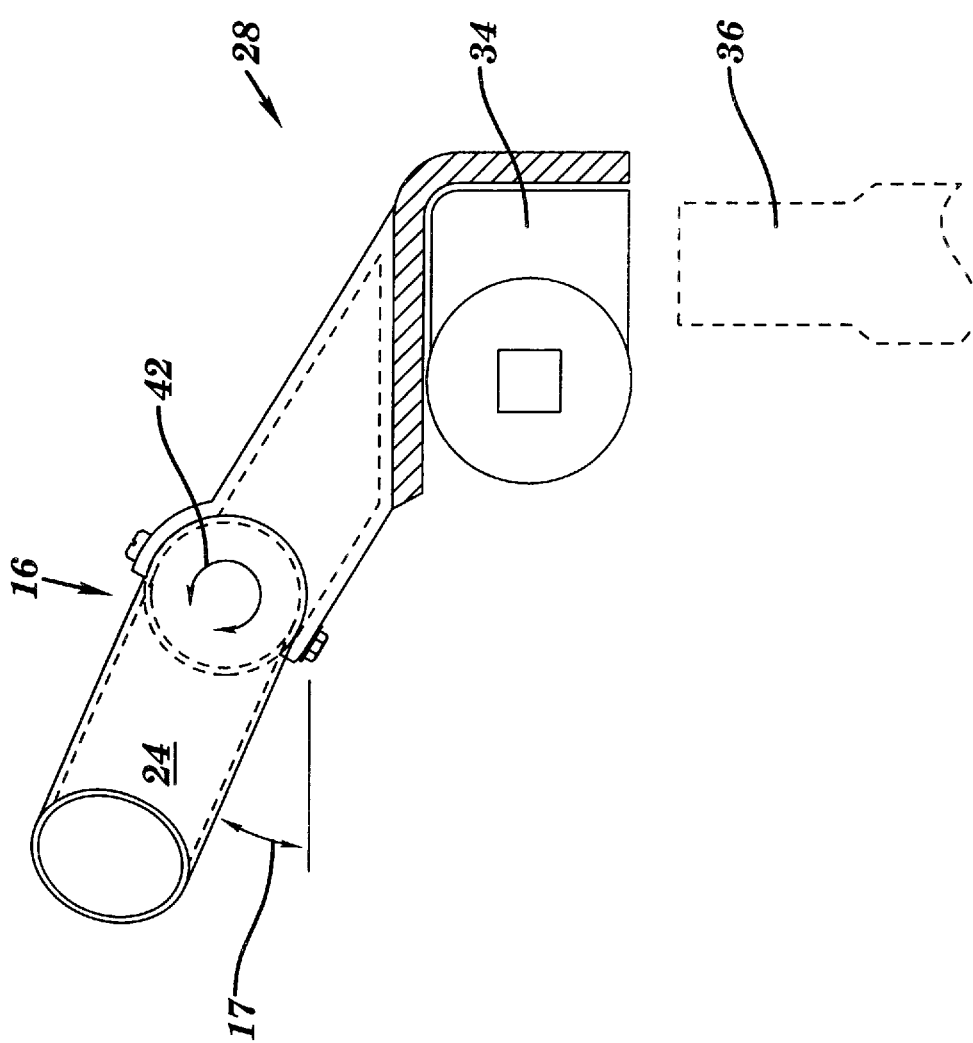
FIG. 3 depicts a side view of the bicycle seat of FIG. 1 in accordance with a first preferred embodiment of the present invention.

Referring now to FIG. 3, a side view of the bicycle seat is depicted (without seat cushions). Here, it can be seen that the end 24 of the elongated member 16 flares upward relative to level (and/or the seat post 36). The upward flare angle 17, measured with respect to level, has been found to be optimal at between 10–20 degrees, with 16 degrees being preferred. It is nevertheless recognized that the upward flare angle 17 could be any amount desired by the rider and/or manufacturer and the actual implementation may need to account for the angle of the seat post 36, which is typically angled back 14–16 degrees. Accordingly, as shown, both seat cushions should flare upward by a predetermined amount relative to a level line in the plane of the bicycle (i.e., parallel to the ground).

FIG. 3 also depicts an embodiment that would allow the elongated member 16 to be rotationally adjustable relative to mounting member 28. As can be seen, the elongated member 16 could be rotated about arrow 42 to allow the user to adjust the upward flare angle 17. The adjustment mechanism could comprise a clamping device, or a release-able pin mechanism, or any other known system for securely mounting a rotatably adjustable tube. In addition to flaring upward, the seat also flares backward. This can be seen in FIG. 4, where each seat cushion has a backward flare angle 19. The backward flare angle 19 for each cushion, measured with respect to a centerline 21, has been found to be optimal at between 15–30 degrees, with 22.5 degrees being preferred. It is nevertheless recognized that the backward flare angle 19 could be any amount desired by the rider and/or manufacturer.

Figure 4:
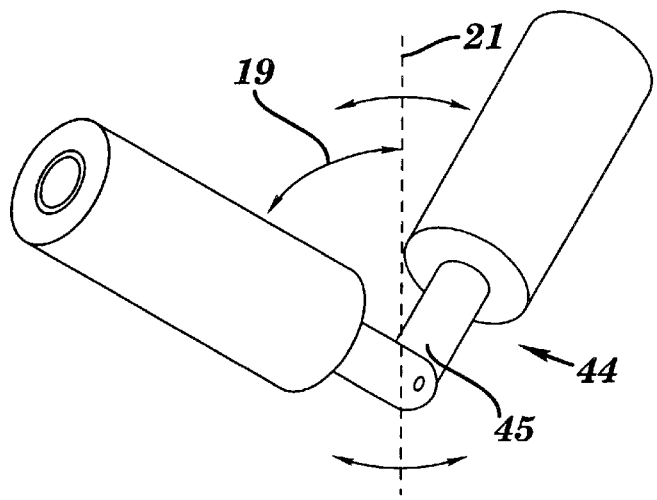
FIG. 4 depicts an alternative embodiment of the seat configuration.

Referring still to FIG. 4, a second alternative embodiment of a seat structure 44 is depicted. In this case, a hinge mechanism 45 is depicted that allows the user to adjust the rearward flare angle 19 for the two seat cushions. Although this alternative embodiment is depicted with a hinge mechanism 45, it is understood that any mechanism allowing for a rearward flare angle adjustment is within the scope of this invention.

Second Preferred Embodiment

Figure 9:
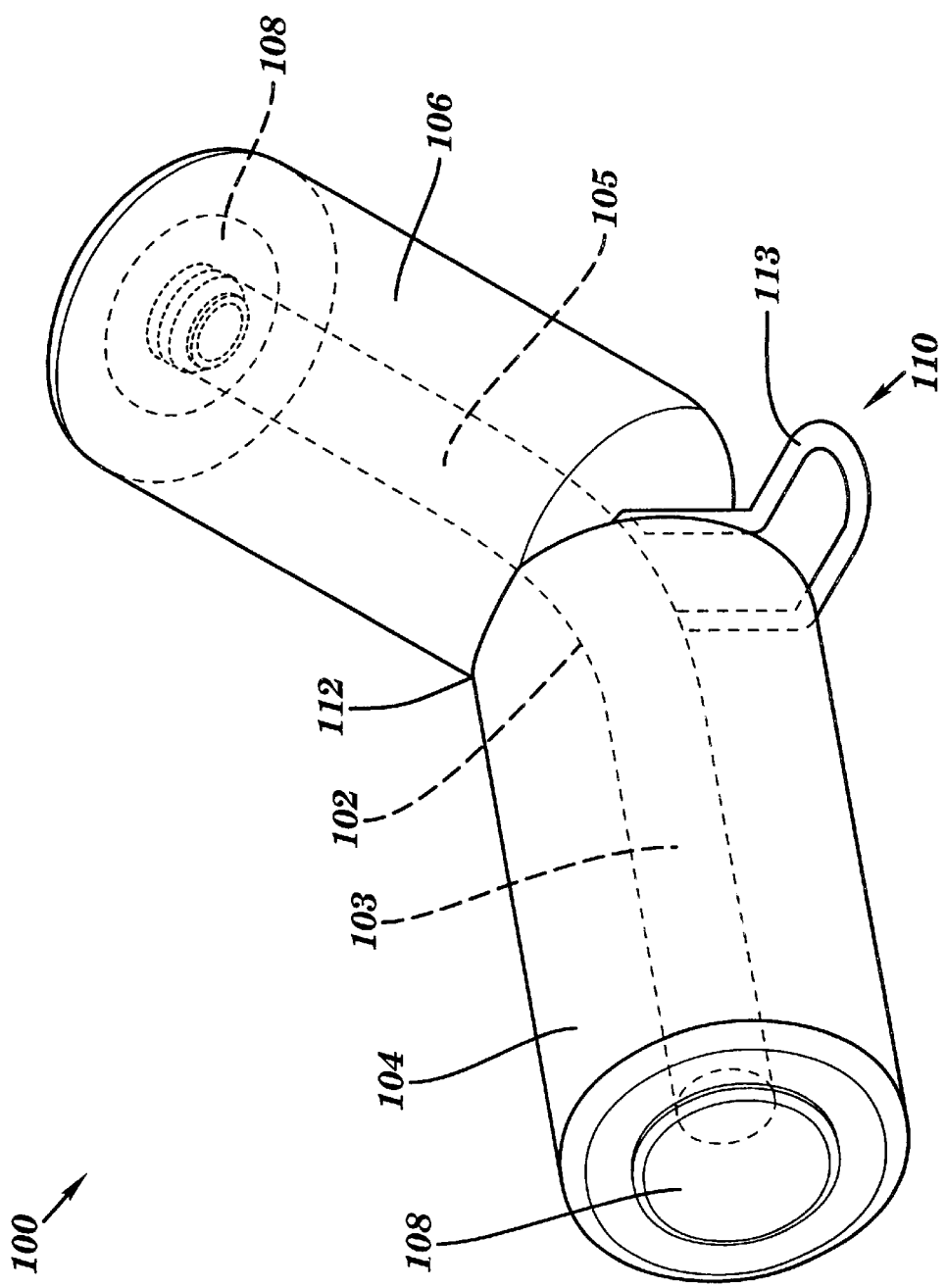
FIG. 9 depicts a front isometric view of a bicycle seat in accordance with a second preferred embodiment of the present invention.
Figure 10:
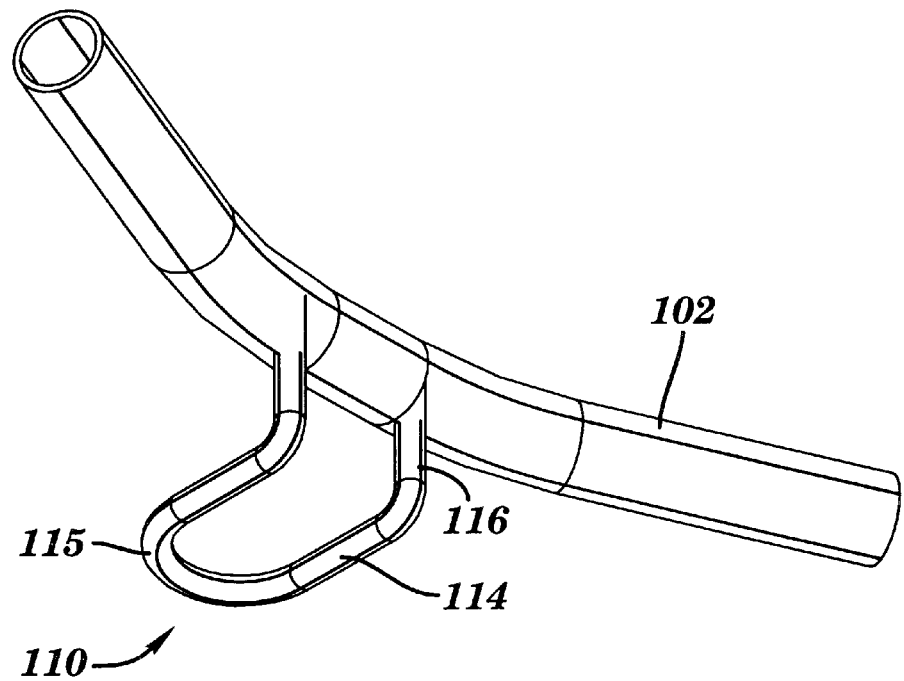
FIG. 10 depicts a rear isometric view of an elongated member in accordance with a second preferred embodiment of the present invention.

FIGS. 9–17 depict a second preferred embodiment of the present invention. FIG. 9 depicts a seat 100 in a front isometric view. FIGS. 15, 16 and 17 depict seat 100 in top, rear, and side views, respectively. Seat 100 comprises an elongated member or inner support bar 102 that is bent in a substantially arcuate configuration. Elongated member 102 is shown alone in a rear isometric view in FIG. 10. The elongated member 102 can be fabricated from any rigid material, such as steel. Moreover, elongated member 102 is preferably hollow (e.g., tubular) in order to reduce the weight and to allow for the insertion of end-caps (described later). While in this preferred embodiment, elongated member 102 has an outer diameter of about one inch, it is recognized that variations can be made without departing from the scope of the invention.

Integrally attached onto elongated member 102 is a mount 110 that allows seat 100 to be readily mounted onto a seat post with existing seat mounting hardware found on most modern bicycles. Mount 110 comprises: (1) a pair of longitudinally extending rods 114 that replicates the mounting rods found on a typical saddle, (2) extension shafts 116 formed at a substantially right angle, and connected to first ends of the longitudinally extending rods 114, and (3) a U-shaped shaft 115 connect to the second ends of the longitudinally extending rods 114. Extension shafts 116 create a clearance between elongated member 102 and the longitudinally extending rods 114. Although extension shafts 116 are shown having a pair of shafts, any type of extension (e.g., a single member) suitable for creating clearance can be used. As can be seen in FIG. 17, mount 110 is preferably (but not required to be) parallel-planar to elongated member 102. Mount 110 can be affixed to elongated member in any known method, e.g., welding, casting, bolting, etc. While mount 110 is described to include a U-shaped shaft 115 at the end of longitudinally extending rods 114, it should be understood that any alternate "end" configuration could be substituted therefor. For example, a square end, or simply two unconnected rods could likewise be utilized. Furthermore, the terms rod and shaft include any type of member suitable for performing the described function. For example, longitudinally extending rods 114 and extension shafts 116 could have a non-uniform or polygonal cross-section.

As is known in the art, a traditional bicycle saddle comprises a pair of parallel mounting rods affixed within the underside of a seat. The rods extend longitudinally, that is parallel to the normal direction of travel of the bicycle, and are secured to the seat post with a dual rail mounting assembly that adjustably clamps onto the pair of mounting rods. Dual rail mounting assemblies are well known in the art and an example of such an assembly is described in U.S. Pat. No. 3,891,333, entitled, MOUNTING ASSEMBLY FOR BICYCLE SADDLE OR THE LIKE issued on Jun. 24, 1975, and hereby incorporated by reference. Longitudinally extending rods 114 in the present invention are advantageously configured to be compatible (i.e., provide a dual rail system) with the mounting rods found under a traditional saddle. Accordingly, seat 100 can be clamped to a seat post with a conventional clamping assembly. This feature therefore gives the present invention a cost and weight advantage, since no new or unique hardware is required for mounting.

Figure 18:
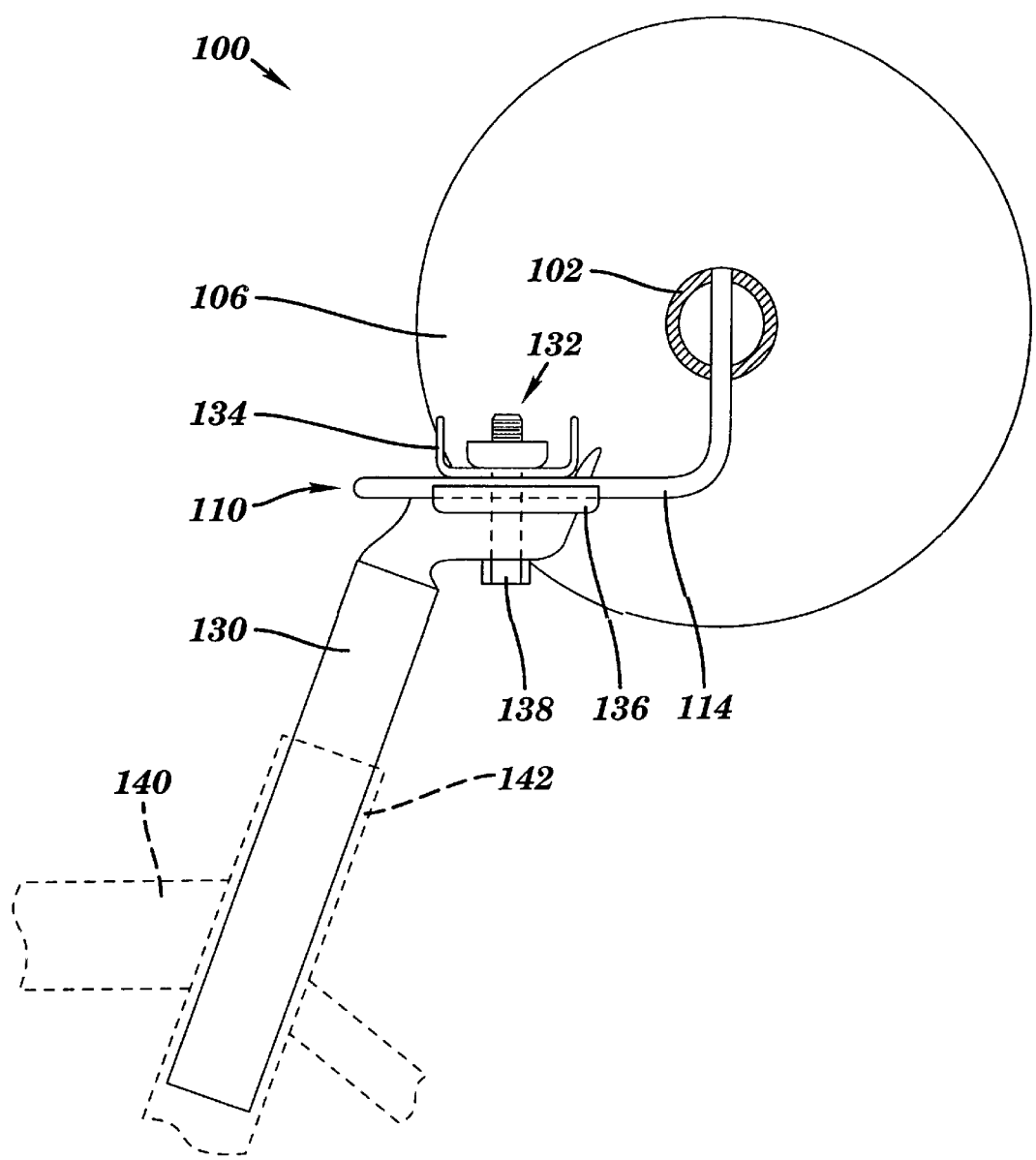
FIG. 18 depicts a side view of a bicycle seat clamped onto a bicycle frame in accordance with a second preferred embodiment of the present invention

Referring to FIG. 18, seat 100 is shown clamped onto seat post 130 using a conventional clamping assembly 132 that is integrally formed as part of seat post 130. Clamping assembly 132 comprises a lower plate 136, an upper plate 134, and a bolt 138. Lower plate 136 is formed with a pair of parallel channels that receive longitudinally extending rods 114. Top plate 134 is clamped down to lower plate 136 with bolt 138. The seat angle (relative to the top tube 140 of frame 142) can be adjusted by sliding lower plate 136 forward or backward. Thus, by utilizing an existing clamping mechanism system, the need for additional hardware to provide angular adjustment to seat is eliminated.

As shown in FIG. 9, seat 100 further comprises a right seat cushion 104 and a left seat cushion 106 that cover right 103 and left 105 portions of elongated member 102. Seat cushions 104, 106 are preferably made from a firm padding material, such as injected urethane foam. The material may also be textured on the exterior to create a non-slip surface. Right and left seat cushions 104, 106 are compressed together at a central region 112 to create a continuous padded area. The seat cushions are also compressed and conform against the support 110 proximate region 113. The two compression regions 112 and 113 cause an outward bias on the seat cushions as shown, for example, by arrows 125 on seat cushion 104 in FIG. 15.

Figure 11:
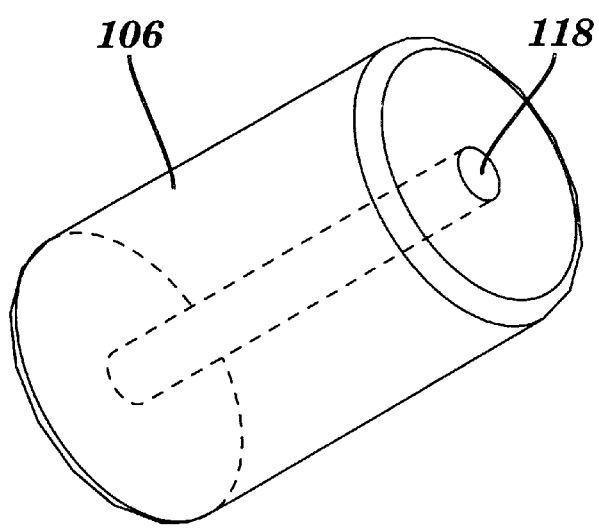
FIG. 11 depicts an isometric view of a seat cushion in accordance with a second preferred embodiment of the present invention.

FIG. 11 depicts seat cushion 106 (which is essentially symetrical to cushion 104) removed from elongated member 102. Cushion 106 is generally tubular in nature and has an outer diameter of about 4.0 inches. Cushion 106 includes a hole 118 that extends through cushion 106 so that the cushion can be slid over an end of elongated member 102. Hole 118 has a diameter, e.g., 0.75 inches, that is preferably less than the cross-sectional diameter of elongated member 102. The smaller diameter of hole 118 helps to ensure that cushions 104, 106 remain fixed and do not spin about the elongated member 102.

Figure 12:
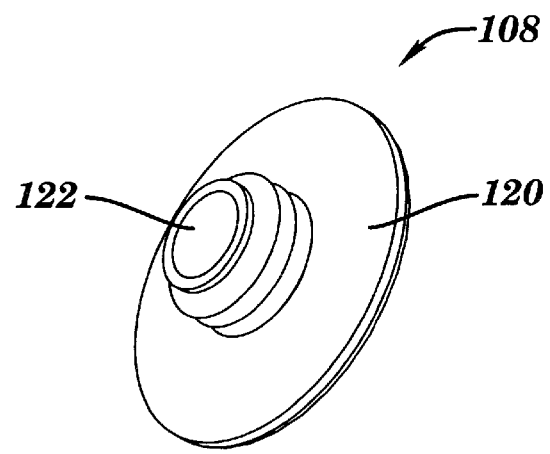
FIG. 12 depicts an end-cap in accordance with a second preferred embodiment of the present invention.

Seat 100 further comprises end caps 108 that are affixed to the ends of the seat 100. FIG. 12 depicts an end cap 108 that includes a finned or threaded portion 122 that can be inserted into an end of elongated member 102. End cap 108 also includes an end plate 120 that has a diameter substantially larger, e.g., 2.0 inches, than the diameter of the elongate member 102, which acts to hold the seat cushion firmly in a compressed position. Accordingly, the large diameter of end plates 120 provide and maintain an inward bias 123 (see FIG. 15) to the seat cushions. This inward bias 123 counteracts outward bias 125 and prevents cushions 104, 106 from expanding while the cushions are being adhesively attached to elongated member 102. The inward bias 123 also prevents seat cushions 104, 106 from laterally expanding during use by a rider.

In order to maximize performance, seat cushions 104, 106 are immovably and fixedly mounted onto elongated member 102, such that cushions 104, 106 are virtually immovable relative to elongated member 102. This is achieved with a variety of functional design elements. First, the seat cushions have a hole 118 whose diameter is less than that of the elongated member 102, thereby creating friction between elongated member 102 and cushions 104, 106. Secondly, an epoxy, glue, or adhesive material (e.g., two-sided tape) may be placed on elongated member 102 to further hold seat cushions 104, 106 in place. Third, seat cushions 104, 106 are compressed against each other (such that the overall length is reduced) at central region 112, thereby creating further resistance against movement. Fourth, end-caps 108 include a large plate 120 that hold the compressed seat cushions 104, 106 in place and prevent the seat cushions from moving. Finally, the arcuate (i.e. curved) shape of elongated member 102 also creates additional resistance to prevent the spinning of the cushions. The result is a firm, continuous seat cushion that is virtually immovable relative to elongated member 102. While this preferred embodiment describes numerous features, it should be recognized that all of the features need not be present, and that sub-combinations of the features may be used.

The method for assembling seat 100 comprises the steps of: (1) placing an adhesive on the elongated member 102 or in the cushion hole 108; (2) forceably sliding the seat cushions 104, 106 onto each end of the elongated member 102; (3) compressing the two seat cushions together at a central location 112; and (4) affixing end caps 108 into the ends of the elongated member to keep each cushion compressed while an adhesive bond is formed between seat cushions 104, 106 and elongated member 102, and thereafter.

Figure 13:
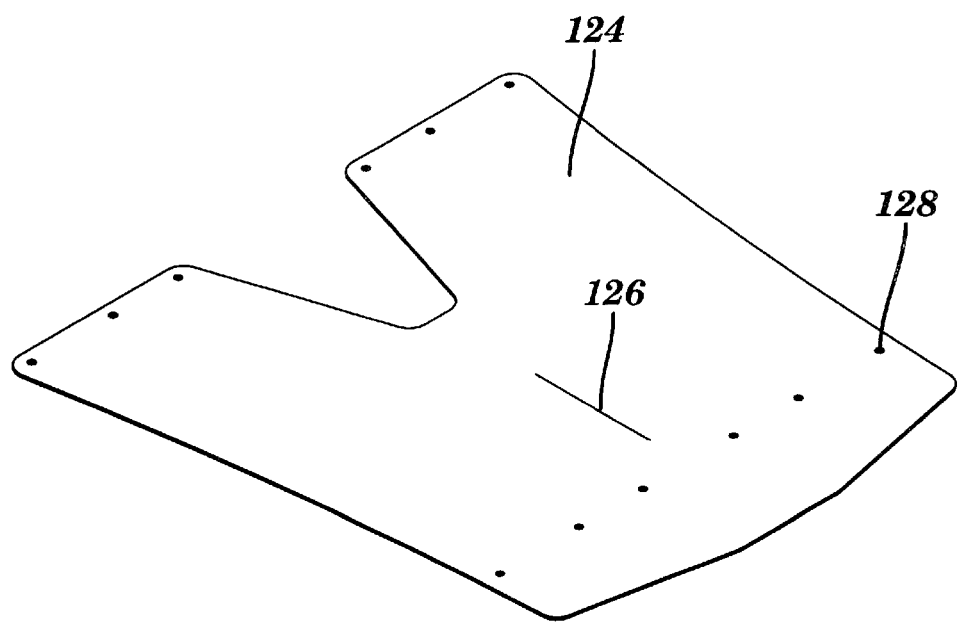
FIG. 13 depicts a cover in accordance with the preferred embodiments of the present invention.
Figure 14:
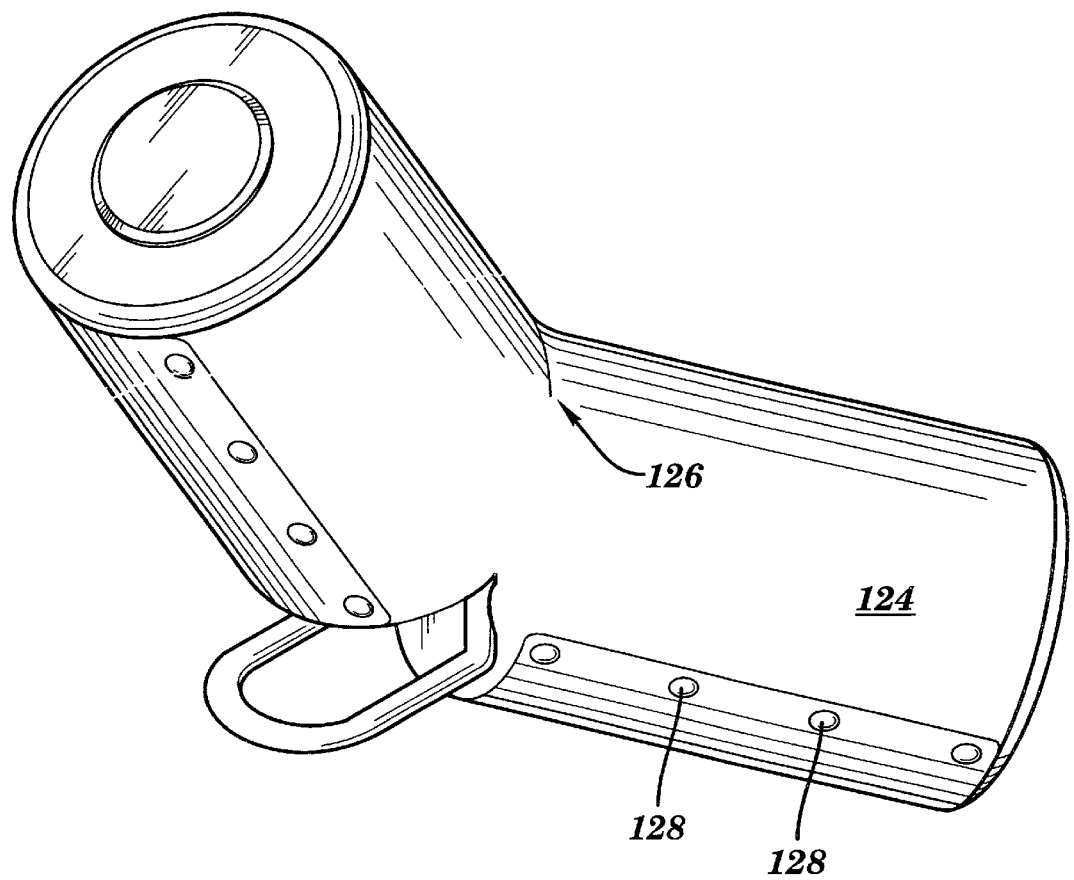
FIG. 14 depicts a rear isometric view of a bicycle seat with the cover on in accordance with a second preferred embodiment of the present invention.

Referring now to FIGS. 13 and 14, a seat cover 124 is shown that wraps around and covers seat cushions 104, 106. Seat cover 124 comprises a seam 126 and connectors 128 (e.g., buttons, snaps, velcro, etc.). Seam 126 pinches seat cover 124 in order to make it more conforming to the V-shaped configuration of the underlying seat cushions 104, 106. Connectors 128 can be used to releasably attach seat cover 124 so that seat cover 124 can be removed, washed and/or replaced.

The foregoing descriptions of the preferred embodiments of the invention have been presented for purposes of illustration and description. They are not intended to be exhaustive or to limit the invention to the precise form disclosed, and obviously, many modifications and variations are possible in light of the above teachings. Moreover, while the preferred embodiments describe a seat for use with a bicycle, it is understood that the seat described herein could be used for other purposes. For example, the seat could be used with exercise equipment, in a paddleboat, as a piece of furniture, in a motorized or mass transit vehicle, or in any application where sitting is required. Such modifications and variations that may be apparent to a person skilled in the art are intended to be included within the scope of the invention as described in the accompanying claims.

I claim:

1. A bicycle seat comprising:
   a substantially arcuate member having a first portion, a second portion and a central portion;
   a support affixed to the central portion of the member;
   a first cushion mounted to the first portion;
   a second cushion mounted to the second portion, the first and second cushions compressed together proximate the central portion of the bicycle seat; and
   a first end cap affixed to one end of the member and a second end cap affixed to another end of the member, wherein the end caps hold the cushions compressed together.

2. The bicycle seat of claim 1, wherein the first and second portions are flared backward and upward relative to a bicycle frame.

3. The bicycle seat of claim 1, further comprising an adhesive that affixes the cushions to the member.

4. The bicycle seat of claim 1, further comprising a removable cover surrounding the cushions.

5. The bicycle seat of claim 1, wherein the support includes an extension extending from the member and a pair of rods extending from the extension.

6. The bicycle seat of claim 1, wherein the end caps are provided as end plates.

7. A bicycle seat, comprising:
   a member having a first portion, a second portion and a Central portion;
   a support affixed to the central portion of the member;
   a first cushion mounted to the first portion; and
   a second cushion mounted to the second portion, wherein the first and second cushions are compressed to conform around the support proximate the central portion.

8. The bicycle seat of claim 7, wherein the member is substantially arcuate and formed to flare backward relative to a bicycle frame.

9. The bicycle seat of claim 7, further comprising an adhesive that affixes the cushions to the member.

10. The bicycle seat of claim 7, further comprising a removable cover surrounding the cushions.

11. The bicycle seat of claim 7 wherein the support includes an extension extending from the member and a pair of rods extending from the extension, and the cushions are compressed to conform around the extension.

12. The bicycle seat of claim 11, wherein the pair of rods are configured to fit a dual rail mounting assembly.

13. A seat for a bicycle, the seat comprising:
   a substantially arcuate member having a first portion, a second portion, and a central portion;
   a support affixed to the central portion of the member;
   a first cushion immovably mounted to the first portion;
   a second cushion immovably mounted to the second portion; and
   a compressed region, proximate the central portion of the member, where a portion of each of the first and second cushions contact and are compressed together.

14. The seat of claim 13, wherein a portion of each the first and second cushions proximate the central portion of the member are separated.

15. A seat for a bicycle, the seat comprising:
   a substantially arcuate member having a first portion, a second portion, and an intermediate portion;
   a support affixed to the intermediate portion of the member;
   a first cushion immovably mounted to the first portion;
   a second cushion immovably mounted to the second portion; and
   a compressed region where an inner portion of the first and second seat cushions are compressed and conform around the support.

16. The bicycle seat of claim 15, wherein the support includes an extension extending from the member and a pair of rods extending from the extension, the cushions being compressed to conform around the extension.

17. A seat for a bicycle, the seat comprising:
   a substantially arcuate member having a first portion, a second portion and a central portion;

a support affixed to the central portion of the member;

a first tubular cushion non-rotatably and immovably affixed to the first portion; and a second tubular cushion non-rotatably and immovably affixed to the second portion.

18. The seat of claim 17, wherein the first and second portions are flared backward and upward relative to a bicycle frame.

19. The seat of claim 17, further comprising an adhesive that affixes the cushions to the member.

20. The seat of claim 17, wherein the support includes an extension extending from the member and a pair of rods extending from the extension configured to fit a dual rail mounting assembly.

* * * * *